United States Patent [19]
Arita et al.

[11] Patent Number: 5,216,618
[45] Date of Patent: Jun. 1, 1993

[54] METHOD AND APPARATUS FOR TAKING OUT AND STORING ARTICLES

[75] Inventors: Masakazu Arita, Kakogawa; Masaki Hirose, Kobe, both of Japan

[73] Assignees: Sumitomo Rubber Industries, Ltd.; Nakata Zoki Co., Ltd., both of Hyogo, Japan

[21] Appl. No.: 620,042

[22] Filed: Nov. 30, 1990

[30] Foreign Application Priority Data

Dec. 2, 1989 [JP] Japan .................. 1-312284

[51] Int. Cl.$^5$ .................. G06F 15/46; B65G 1/00
[52] U.S. Cl. .................. 364/478; 235/375; 235/385; 414/274; 414/277
[58] Field of Search .............. 364/478, 468; 235/375, 235/385, 380; 414/273, 274, 277–282

[56] References Cited

U.S. PATENT DOCUMENTS

| | | | |
|---|---|---|---|
| 3,986,612 | 10/1976 | Kamm et al. | 209/111.7 |
| 4,247,245 | 1/1981 | Stolt et al. | 414/786 |
| 4,415,975 | 11/1983 | Burt | 364/478 X |
| 4,636,634 | 1/1987 | Harper et al. | 235/385 X |
| 4,669,047 | 5/1987 | Chucta | 364/478 X |
| 4,773,810 | 9/1988 | Nishimura et al. | 414/281 X |
| 4,932,828 | 6/1990 | Katae et al. | 364/478 X |
| 5,113,349 | 5/1992 | Nakamura et al. | 235/385 X |

FOREIGN PATENT DOCUMENTS

| | | |
|---|---|---|
| A0198402 | 7/1987 | Fed. Rep. of Germany . |
| WO90/0071-61 | 6/1990 | Fed. Rep. of Germany . |
| WO86/01608 | 3/1986 | World Int. Prop. O. . |

OTHER PUBLICATIONS

Partial English Translation of EP-A-0198402 (Germany); Jul. 1, 1987.
Partial English Translation of WO-A-9007161 (Germany) (Jun. 28, 1990).

*Primary Examiner*—Joseph Ruggiero

[57] ABSTRACT

An apparatus for taking out and storing articles includes a stocking device having a plurality of compartments for storing articles, a carrier for moving articles which is movable with respect to the stocking device in multi directions, and a control device for memorizing the position of a compartment in which an article is stored and for controlling movement of the carrier by means of the identification code on the article. The storing and taking out articles can be carried out automatically, thereby reducing operation time required for storing and taking out articles.

15 Claims, 9 Drawing Sheets

METHOD AND APPARATUS FOR TAKING OUT AND STORING ARTICLES

BACKGROUND OF THE INVENTION

1. Field of the Invention

The present invention relates to a method and an apparatus for taking out a required article from a compartment of a rack or set of shelves and for storing or shelving the same in one of the compartments.

2. Description of the Background Art

Heretofore a stocking device having a lot of compartments or shelves has generally been used in order to store many different types of articles. As an example in the process of producing a tire, a die plate is used for extruding components such as tire treads. Many different kinds of die plates are selectively used in accordance with different sizes or types of tires and the components to be made. Thus several hundred different die plates corresponding to the different sizes or patterns of various kinds of tires should be prepared beforehand for a single tread extrusion line. In the conventional method for stocking die plates they are manually arranged and stored in compartments in racks.

However, in the conventional method, it is not easy to search for the position in a rack in which a required article is stored.

Furthermore there is now a change so that many kinds of tires are now produced on a small production scale basis as a result of progress in diversification of recent tire demands, so the frequency of changes of die plates in the tread extrusion line has become very high. Accordingly, using the above-mentioned storing method, it always takes too much time to find a required die plate from amongst the large number of die plates arranged in the storing racks.

Further, three is a danger of taking out a wrong die plate because there are many die plates which are similar to one another in size or shape. If a wrong die plate is used by mistake, there results a serious and very expensive defect in the tire quality. Therefore, there is a need for such error to be avoided absolutely.

SUMMARY OF THE INVENTION

An object of the present invention is to solve the above-mentioned drawbacks, and to provide a method and an apparatus for automatically taking out and storing articles ensuring correct and quick taking out or storing of the articles.

Accordingly, the present invention provides an apparatus for taking out and storing articles comprising (a) a stocking device having a plurality of compartments for storing articles, (b) a carrier for taking out required articles from the compartments of the stocking device and for storing articles in the compartments of the stocking device, the carrier being movable relative to the stocking device in multi directions, and (c) a control device for memorizing the position of a compartment in which an article is stored and for controlling movement of the carrier in order to take out or store the article by means of an identification code on the required article.

Preferably the apparatus has a reader for reading an identification code marked on the article and for ascertaining that the taken-out article is the required one.

The present invention further provides a method for taking out a required specific article from a stocking device in which many articles are stored comprising.

(a) memorizing, in a memory, an identification code for each article and the address of the compartment storing said article, (b) inputting an identification code marked on the specific article to a control device, (c) moving a carrier to the position in a rack storing the specific article and taking it out from the rack, and (d) transferring by the carrier the taken-out specific article to a predetermined position and putting the specific article into the predetermined position.

It is preferable that the method further includes the step of reading an identification code marked on the specific article by means of a reader in the course of taking out the specific article from the rack and for checking whether or not the taken-out article is the required one.

The method may also comprise storing a specific article in a vacant compartment of the stocking device comprising inputting the code marked on the specific article into a control device, taking out the specific article from a predetermined position and moving it to any vacant compartment of the stocking device by the carrier and putting the specific article into the compartment for storage and memorizing, in the memory, an address for the compartment storing the specific article and the identification code of the specific article.

In the apparatus of the present invention the identification code of the article to be taken out or stored is inputted to the control device, so that the carrier can take out the required article from any compartment of the stocking device or alternatively may put an article into a predetermined position or store it in a vacant rack.

Further, when the code reader operates, the identification code marked on the article is read and compared with the inputted code to check whether or not the taken-out article is the required one.

In the method of taking out articles of the present invention, the identification codes of the articles and the addresses of the compartments storing the articles are memorized in a memory, and the identification code marked on the article is inputted to the control device. The carrier is then moved to the position in which the article is stored to take out the article. The article taken out is transferred to and put in the predetermined position.

Further, in the present invention, it is possible, in the course of taking out the specific article from the rack, to read the identification code marked on the article by means of the code reader and thus to check whether the taken-out article is the required one or not. This removes reliance on the compartment address alone.

In the method of storing articles of the present invention, when the identification code marked on the article put in the predetermined position is inputted to the control device, the carrier draws out the article from the predetermined position and moves it to a vacant compartment in the rack, and puts the article into it. The address of the compartment storing the article and the identification code of the article are both memorized in the memory.

Further, in the storing method of the present invention, it is possible, in the course of taking out the specific article, to read the identification code marked on the article itself by means of the code reader and thus to check whether the taken-out article is the required one or not.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus, are not limitative of the present invention and wherein:

FIG. 1b is a side view of the stocking device of FIG. 1a;

FIG. 1c is an enlarged partial view of the encircled portion of FIG. 1a;

FIGS. 4 to 6 are views illustrating the operation of the carrier in FIG. 1 wherein

DETAILED DESCRIPTION

Next there is explained an embodiment of the present invention, based on the accompanying drawings, wherein a method and an apparatus for taking out and storing articles of the present invention are applied to die plate storage for an extrusion line for treads of tires.

Figure 1A:
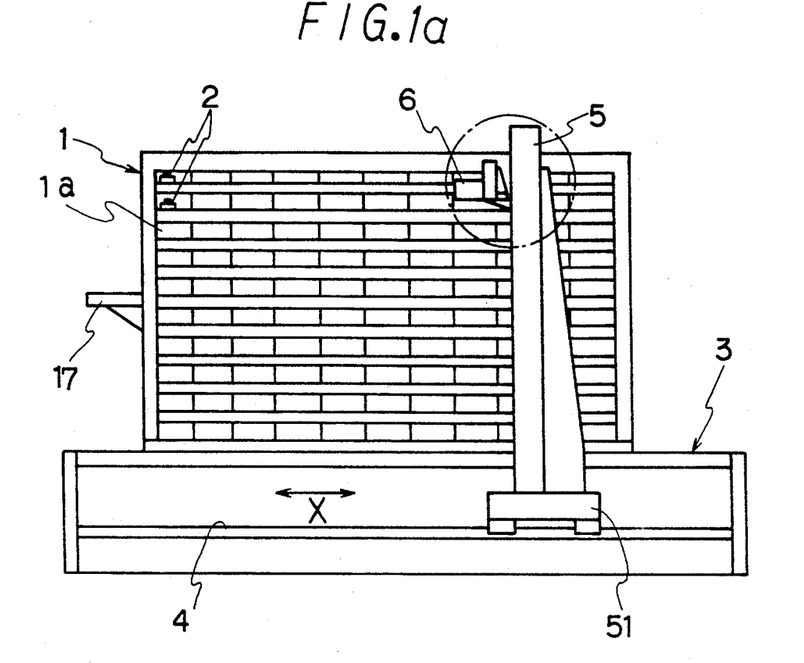
FIG. 1a is a schematic overall front view of a stocking device for die plates.
Figure 1B:
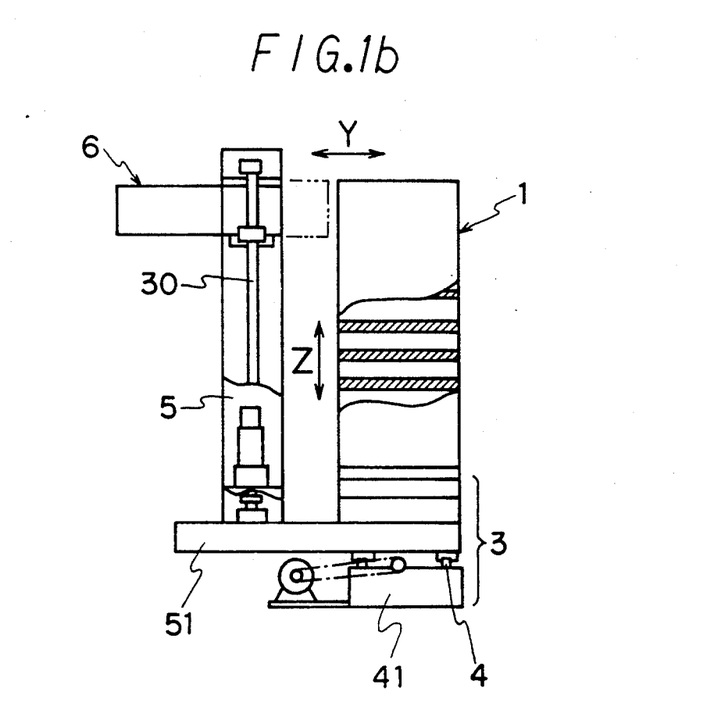
Figure 1C:
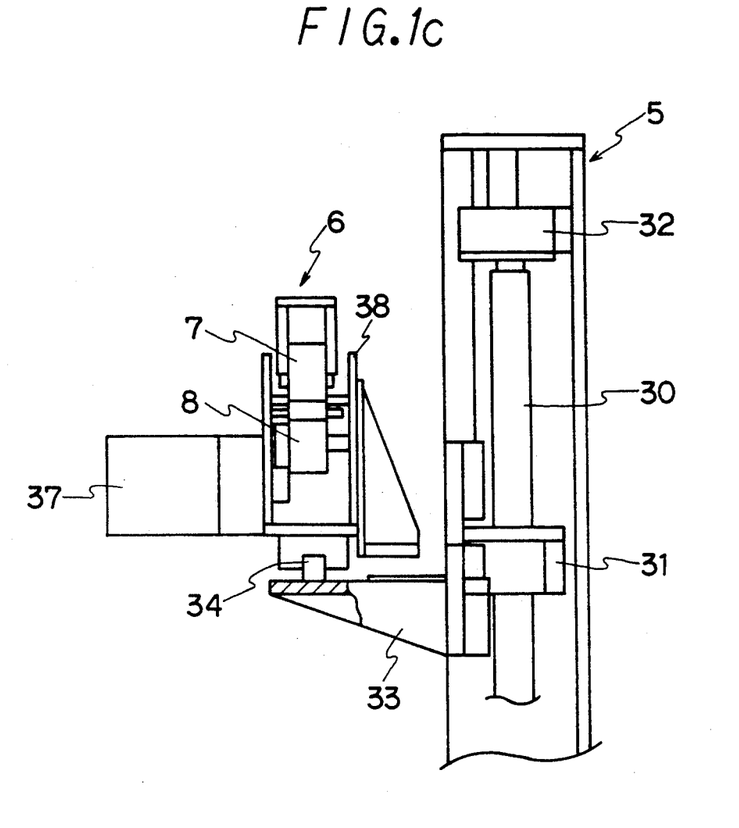
Figure 2:
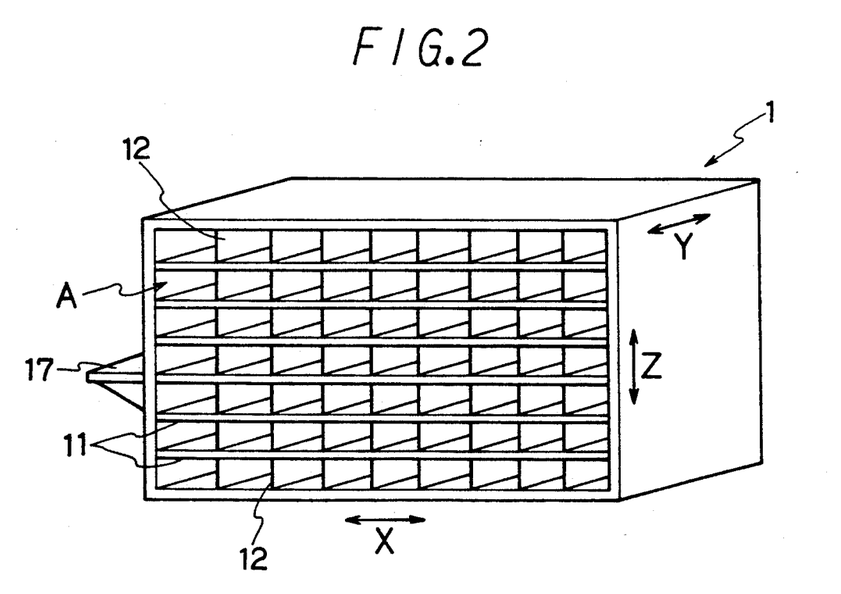
FIG. 2 is a perspective view of the stocking device.

A stocking device 1 has a plurality of compartments 1a in a rack which can store die plates 2 mounted on a base 3, as illustrated in FIGS. 1a–1c.

The base 3 has a lower frame 41. On an upper surface of the lower frame 41, a rail 4 is arranged parallel to the X axis of the stocking device 1. A travelling platform 51 is movably set on the rail 4.

On the travelling platform 51 an up-down column 5 is mounted. A carrier 6 which can go up and down in the direction of the Z axis of the stocking device 1 is provided driven on the column 5 by means of a ball screw 30 rotated by a motor.

In FIG. 1c, numeral 31 shows a ball screw nut, numeral 32 shows a bearing of the ball screw, numeral 33 is a supporting frame fixed to the ball screw nut 31 and supporting the carrier 6, and numeral 34 is a rail arranged on the supporting frame 33 to extend in the direction of the Y axis of the stocking device 1.

Thanks to the above construction, the carrier 6 can be moved in the directions of the X axis, the Y axis and the Z axis of the stocking device 1, so that the carrier 6 can stop in front of any compartment or a predetermined position, for example a receiving table 17, and then can take out or store a die plate.

Figure 3:
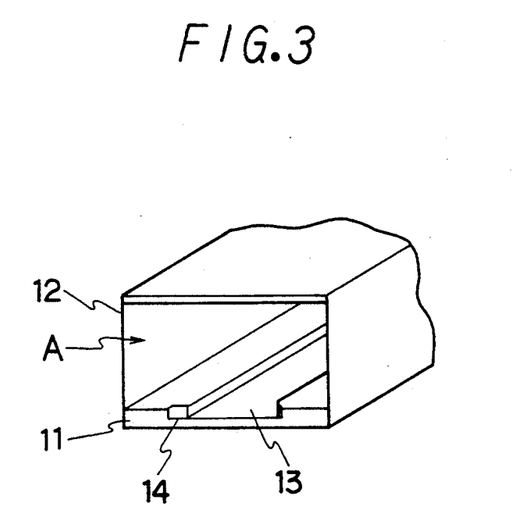
FIG. 3 is an enlarged view of a main portion of the stocking device.

Further, as shown in FIG. 3, the stocking device 1 is provided with a receiving table 17 extending in the direction of the Y axis of the stocking device 1 on the sidewall thereof. This is referred to as the predetermined position. The receiving table 17 serves to keep a die plate 2 taken out from the rack for a while before being fitted to an extruder and also to keep a used die plate 2 for a while before being stored.

Compartments of the stocking device 1 are composed of a plurality of shelf plates 11 which extend horizontally in the direction of the Y axis. The racks are divided into a plurality of box-shaped storing compartments A by partitions 12 extending in the vertical direction (direction of the Z axis).

The storing compartment A is now explained in detail referring to FIG. 3. In the approximate center of the shelf plate 11 of the storing compartment A, there is formed a groove 13 for facilitating the insertion of a die plate 2 which extends in the depth direction of the storing compartment A (in the direction of the Y axis). At the front end portion the groove 13 is provided with a wider portion 14 such that the die plate 2 can be easily inserted into the groove 13.

It is preferable that a bottom surface of the storing compartment A, that is to say, an upper surface of the shelf plate 11 is made of material having a low coefficient of friction such as synthetic resin. The upper surface of the shelf plate 11 might be covered with material having a low coefficient of friction, or the shelf plate 11 itself might be made of material having a low coefficient of friction.

In the apparatus having the above-mentioned constitution, the identification code of a specific die plate 2 is inputted into the control device by a worker, so that the carrier 6 takes out the required die plate 2 from the compartment where it is held and puts it on the receiving table 17. Alternatively a used die plate 2 may be stored into a vacant storing compartment A of the stocking device 1 by the carrier 6.

The partitions 12 extending in the vertical direction need not be necessarily used in the present invention. However, the ascertainment of storing compartments A becomes easier when partitions 12 are provided as stated above.

Figure 4:
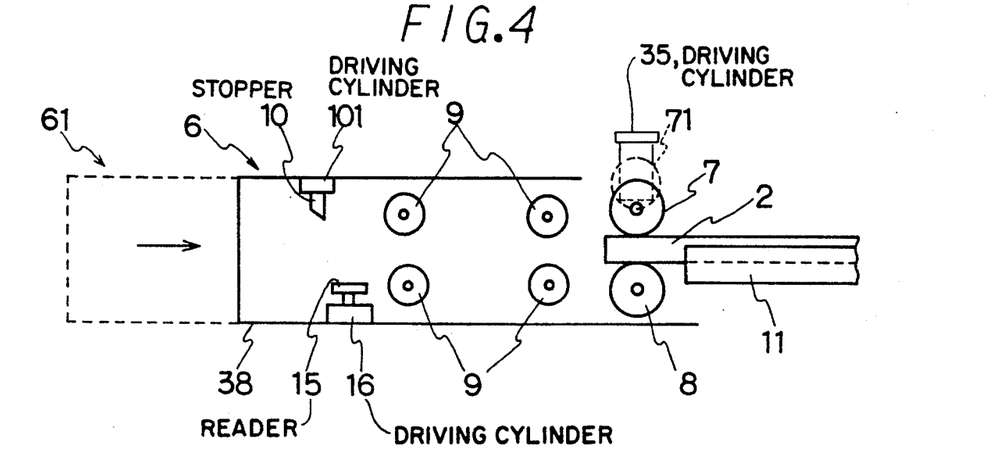
FIG. 4 shows the state in which an operation of taking out a die plate starts.

Next, the inside of the carrier 6 will be explained with reference to FIGS. 4–6. In a casing 38 which is made open on the side of the stocking device 1, a movable pressing roller 7 and a fixed driving roller 8 are arranged in the upper portion and in the lower portion of the casing 38 respectively. The pressing roller 7 can be moved up and down by means of a driving cylinder 35. Two pairs of guide rollers 9 are also provided at predetermined intervals in both upper and lower portions of the casing 38. Near the closed end of the casing 38, there are arranged a reader 15 which can be moved up and down by a driving cylinder 16 and a stopper 10 which can be moved up and down by a driving cylinder 101.

For a reader 15, it is preferable to use, for example, a reflecting type fibre sensor made by SUNX CORP. An identification code is provided beforehand on a predetermined portion of each die plate 2 by engraving or other suitable device for the reader 15.

The stopper 10 is lowered by means of the driving cylinder 101 and contacts the die plate 2 to stop the die plate 2 taken out from the rack at a predetermined position in the carrier 6. After the die plate 2 is positioned and stopped, the reader 15 is raised by means of the driving cylinder 16 so that the above-mentioned identification code provided beforehand on the predetermined portion of the die plate 2 is read.

The use of a wrong die plate 2 can be avoided by reading the identification code marked on the die plate 2 and checking it with an inputted identification code.

Next, the method of operation of taking out die plates according to this invention is explained. When the operation of taking out a die plate starts, as shown in FIG. 4, the carrier 6 moves forward and approaches the shelf plate 11 from a stand-by position 61 shown by the dotted line by the rotation of a feed screw driven by a motor 37. Then, when the fixed driving roller 8 reaches a tip of the die plate 2 on the shelf plate 11, the movable pressing roller 7 comes down from the stand-by position 71 shown in the dotted line to put the tip of the die plate 2 between rollers 7, 8. The die plate 2 is then taken out from the shelf plate 11 by the rotation of the driving roller 8 into the carrier 6.

Figure 5:
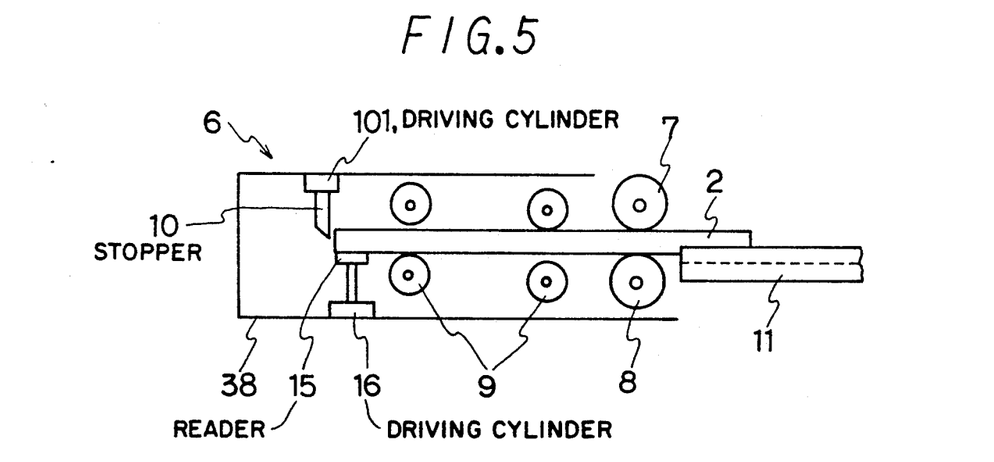
FIG. 5 shows the state in which the die plate is checked and identified.

For the operation of ascertaining the correct identity of the die plate, as shown in FIG. 5, the die plate 2 is taken out from the shelf plate 11 by rotation of the driving roller 8, and contacts the stopper 10 which is lowered by means of the cylinder 101 at the same time that the carrier 6 moves forward toward the shelf plate, so that the die plate 2 is stopped at the predetermined position in the carrier 6. Next, the reader 15 is raised by the cylinder 16 and reads the identification code engraving or the like provided at a predetermined position on the die plate 2 to check the code with identification code inputted beforehand.

When the taken-out die plate is ascertained to be a wrong die plate as a result of the above checking procedure, the driving roller 8 is rotated reversely to move backward and return the die plate 2 to the shelf plate 11, and the required die plate is searched for again. On the contrary, when the taken-out die plate is ascertained to be the correct die plate, the reader 15 is then lowered by a signal that the taken-out die plate is the correct one. The stopper 10 rises and allows the die plate 2 to be fully drawn into the carrier 6.

Figure 6:
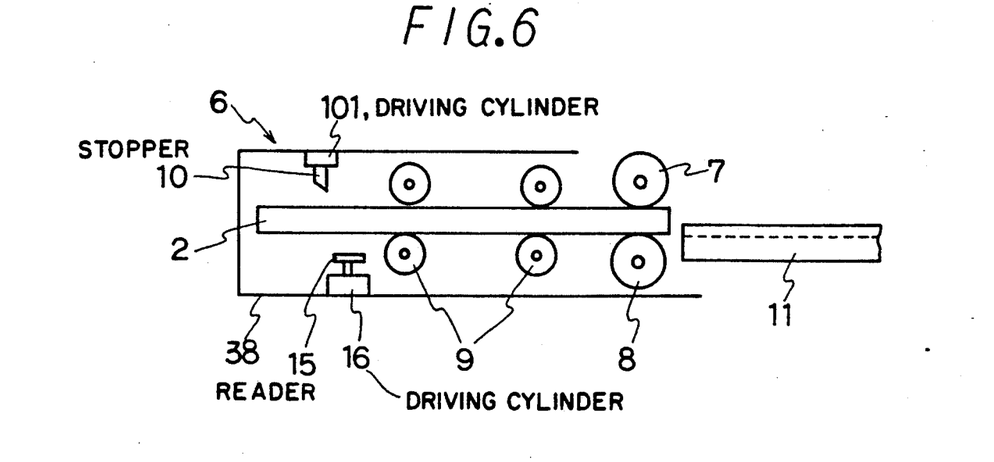
FIG. 6 shows the state in which the operation of taking out the die plate finishes.

When the operation of taking out the die plate is ended, the die plate 2 departs from the shelf plate 11 and is totally housed within the carrier 6 as shown in FIG. 6. Then the carrier 6 moves to and stops at the position of the receiving table 17, and the die plate 2 is fed onto the receiving table 17 by the reverse rotation of the driving roller 8.

The method for storing die plates comprises, placing the die plate 2 on the receiving table 17 and entering the identification code of the die plate 2 into the control device. Then the die plate 2 is taken into the carrier 6 in the same way as the taking-out operation mentioned above. Next, the carrier 6 moves to the front of any one of the vacant storing compartments A. The die plate 2 is fed into and stored in the compartment by the rotation of the driving roller 8, and the address of the rack in which the die plate 2 is stored and the identification code are memorized (remembered) in the memory.

By connecting a computer to the above-mentioned stocking device, each die plate 2 can be memorized with the help of the identification code given to the die plate and the co-ordinate of the storing position corresponding to each die plate as the address of the compartment. Accordingly, merely by inputting an identification of a die plate, a required die plate can be automatically taken out. Also a used die plate can be automatically stored in a vacant storing compartment.

Figure 7:
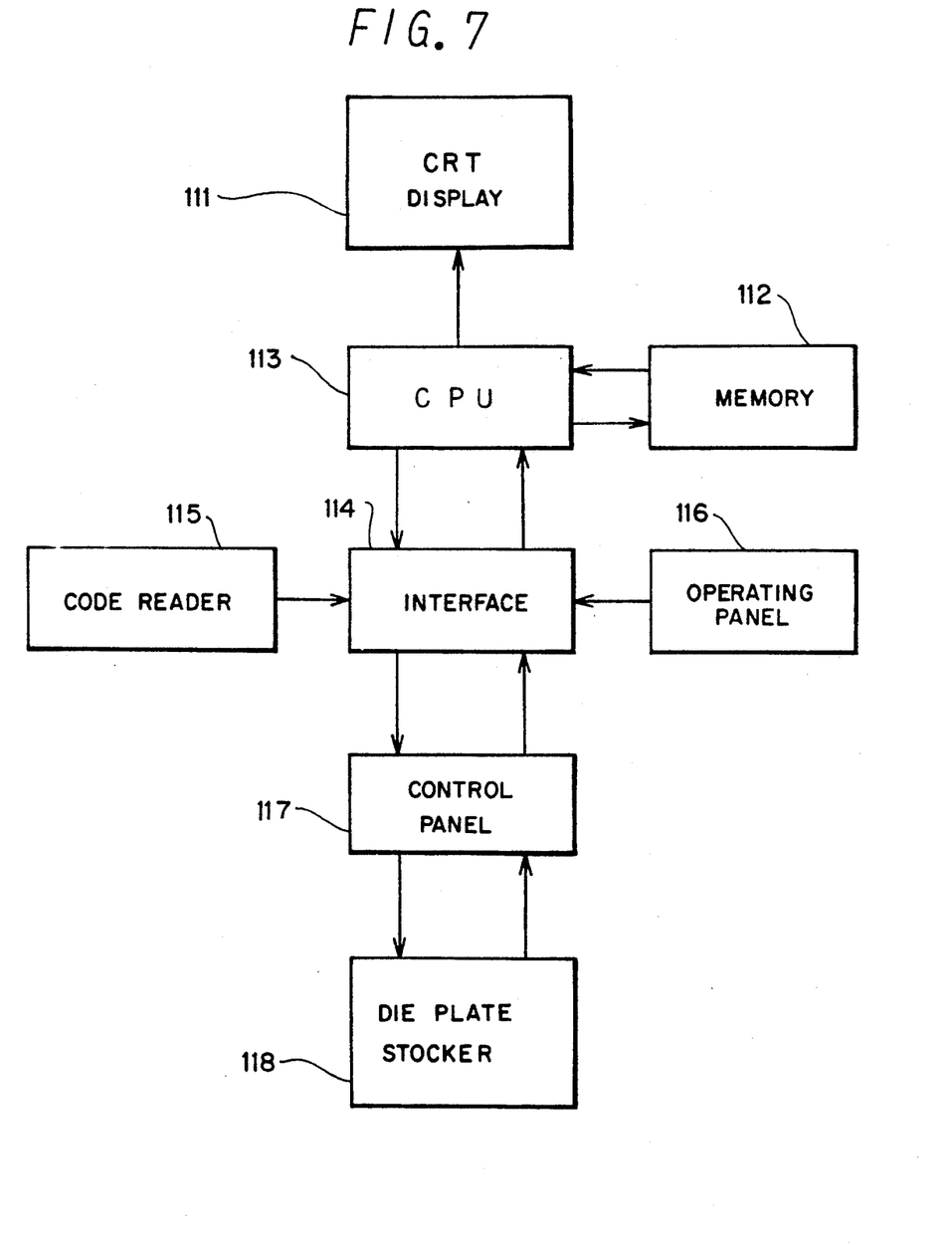
FIG. 7 is a block diagram of the control system.

The control system using a computer will now be described as follows based on a block diagram of a control system of a die plate stocker.

A display device 111 (CRT: cathode ray tube) for indicating messages and a memory 112 such as a disc device for storing the identification code of each die plate and the address of the compartment in which the die plate is stored are connected to an arithmetic unit 113 (CPU: central processing unit). There are further connected to the arithmetic unit through an interface 114, a reading sensor 115 which reads the marking (identification code) an operating panel 116 having a push button switch or a digital switch and the like, and a control panel 117 which controls the die plate stocker 118.

Next, the operation of the apparatus of the present invention is explained based on the flow charts shown in FIGS. 8a, 8b, 9a and 9b. Firstly, it is judged by a signal from the operating panel whether the die plate is required to be stored or taken out.

When the die plate is to be stored (refer to FIGS. 8a and 8b), the identification code, for example the number, of the die plate put into the operating panel is read, and the carrier 6 is moved to the front of the receiving table 17. Thereafter, the carrier 6 is moved forward and the pressing roller 7 is lowered to engage the die plate. Next, the die plate is drawn into the carrier 6 by rotating the driving roller 8. In the carrier 6, the identification code of the drawn die plate 2 is read and is checked with the code inputted through the operating panel.

Figure 8A:
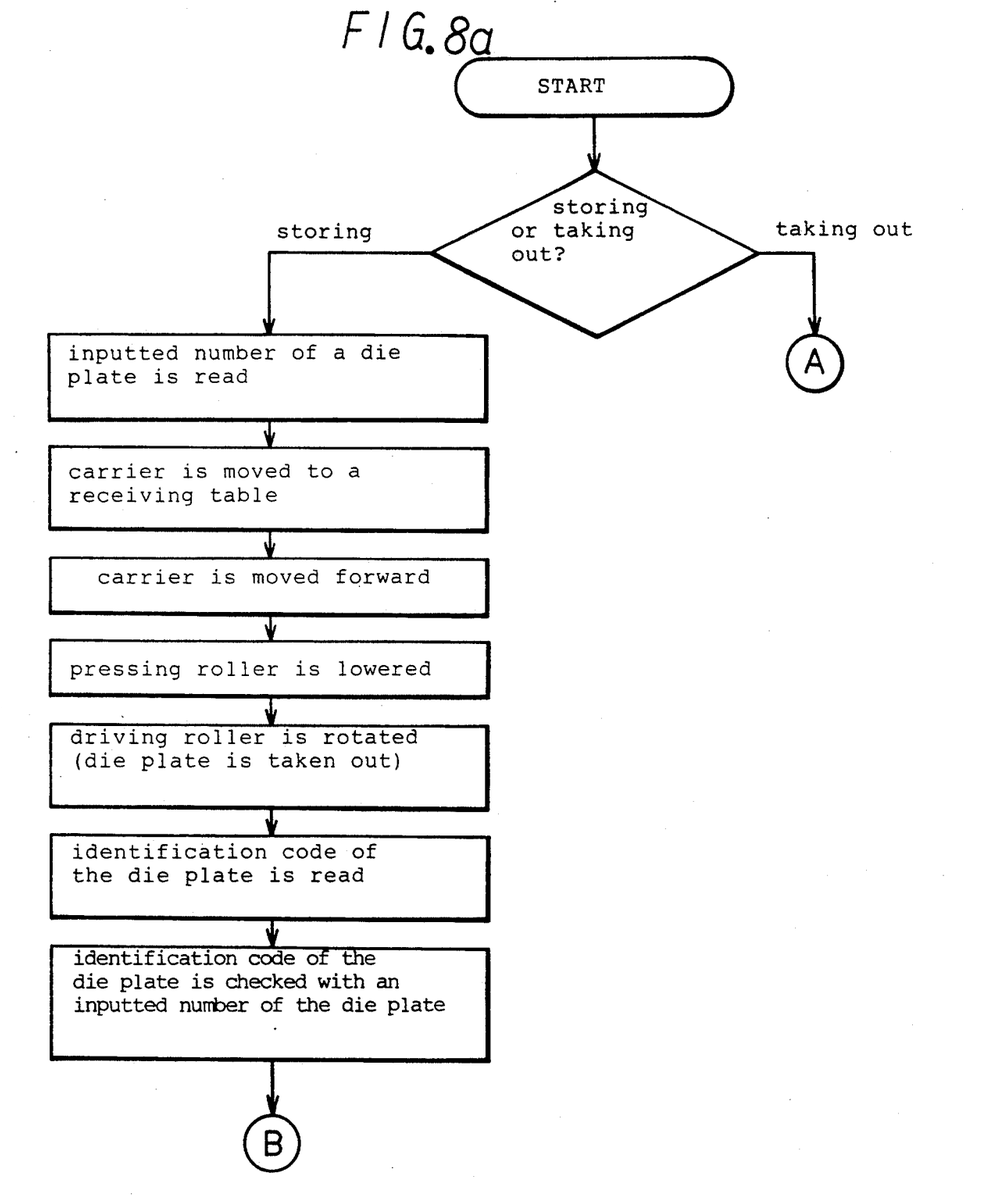
FIGS. 8a, 8b, 9a and 9b are flow charts of the control system of FIG. 7.
Figure 8B:
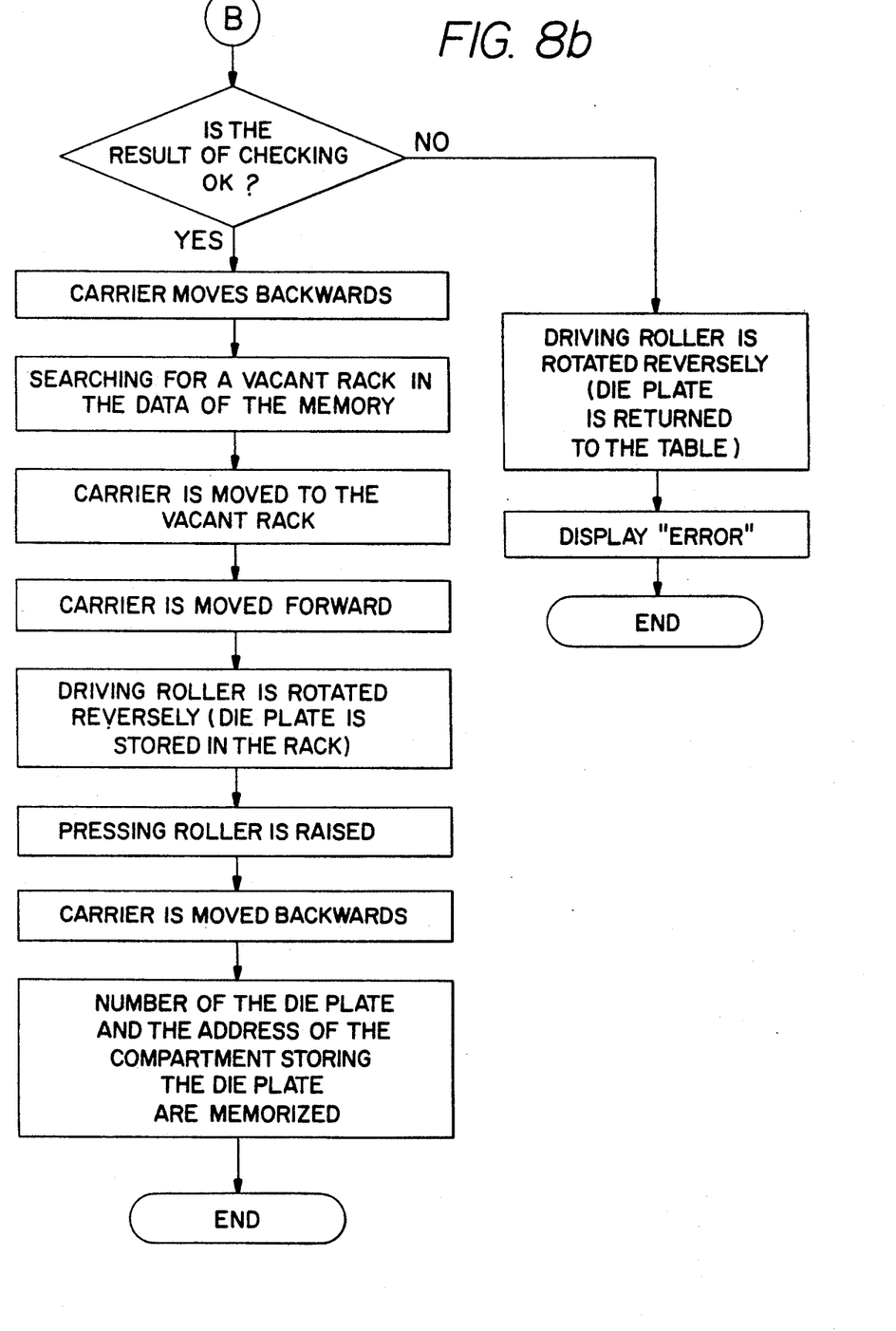

As a result of the checking procedure, when the code inputted through the operating panel does not coincide with the code read by the reader 15 in the carrier 6, the driving roller 8 is rotated reversely to return the die plate 2 to the receiving table 17. An error message is displayed on the CRT.

On the contrary, when the code inputted through the operating panel coincides with the code read by the reader 15 in the carrier 6, the carrier 6 moves backwards with the die plate 2. After searching for a vacant rack (space) of the stocking device 1 from data in the memory, the carrier 6 is moved to the front of the vacant compartment.

After the carrier 6 is moved forward to the vacant compartment the driving roller 8 is rotated reversely to feed the die plate 2 into the rack for storage, the pressing roller 7 is raised and the carrier 6 is moved backwards. The storing operation is ended by memorizing the code of the stored die plate 2 and the address of the compartment in which the die plate 2 is stored.

When the die plate is to be taken out (refer to FIGS. 9a and 9b), the identification code of the die plate inputted in the operating panel is read, and the address of the rack in which the die plate 7 is stored is searched for in the data of the memory. If the die plate 2 having the inputted numeral is not found, the operation is ended by displaying an error message on the CRT.

Figure 9A:
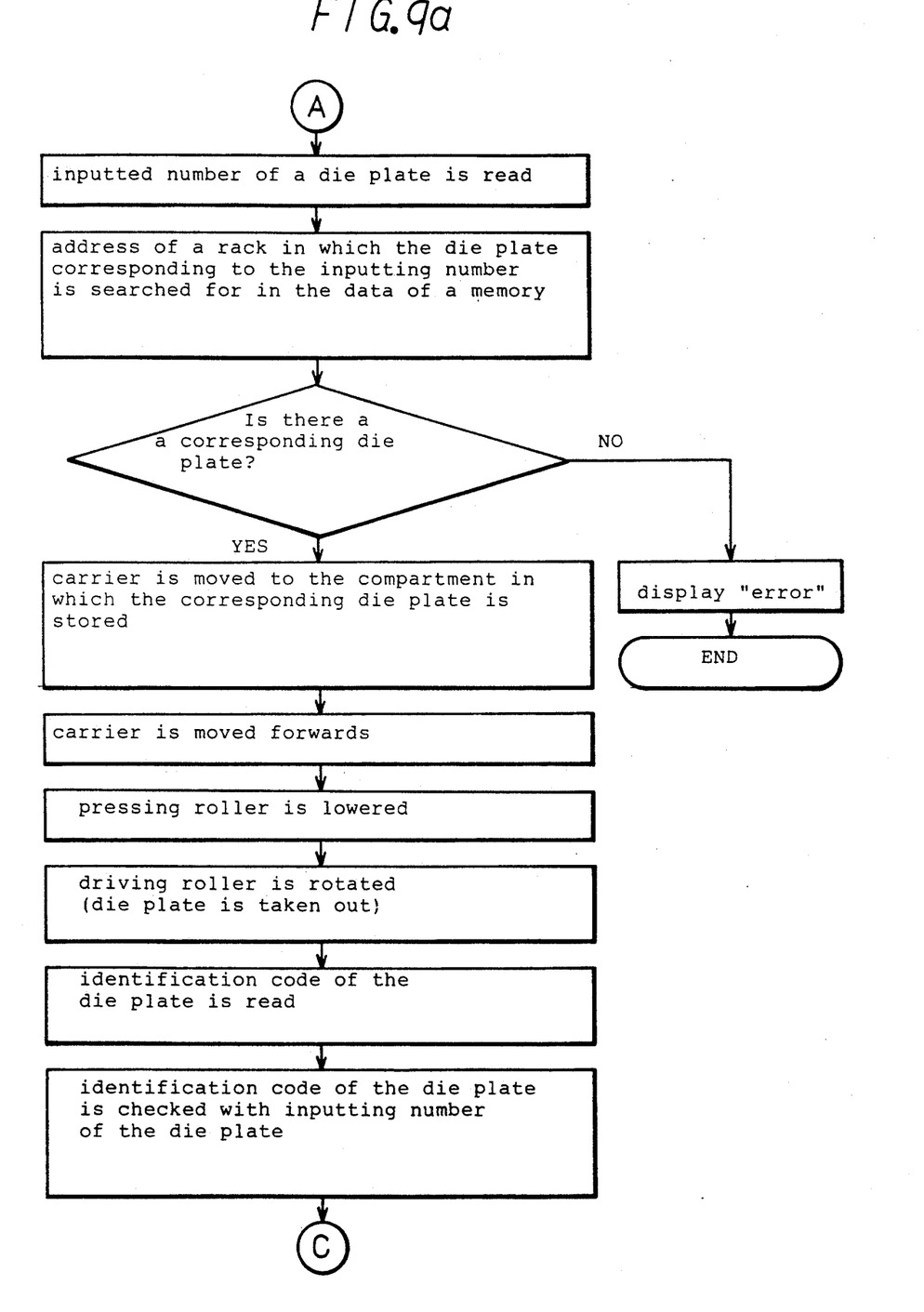
Figure 9B:
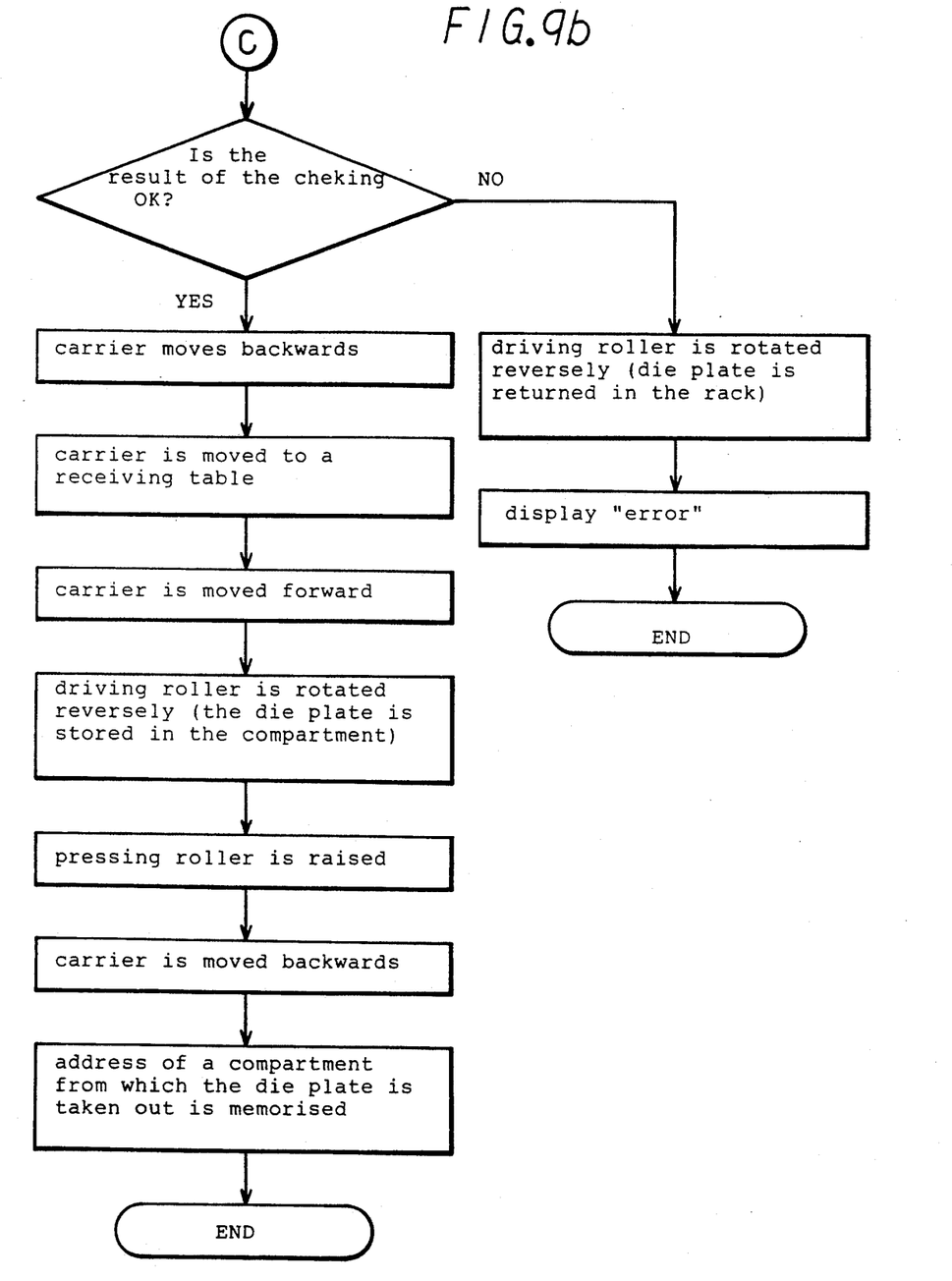

On the contrary, when the die plate 2 having the inputted numeral is found, the carrier 6 is moved to the front of the compartment in which the die plate is stored. Then, the carrier 6 is moved forward and the pressing roller 7 is lowered. Thereafter, the driving roller 8 is rotated to draw the die plate 2 into the carrier 6.

The identification code of the die plate 2 drawn in the carrier 6 is read and checked with the code inputted through the operating panel.

As a result of the checking procedure, if the code inputted through the operating panel does not coincide with the code read by the reader 15 in the carrier 6, the driving roller 8 is rotated reversely to return the die plate 2 back into the rack. An error message is displayed on the CRT.

On the contrary, when the code inputted through the operating panel coincides with the code read by the reader 15 in the carrier 6, the carrier 6 moves backwards with the die plate 2 and moves to the front of the receiving table 17.

After the carrier 6 is moved forward and the driving roller 8 is rotated reversely to put the die plate 2 on the receiving table 17, the pressing roller 7 is raised and the carrier 6 is moved backwards. The taking-out operation is ended by memorizing the address of the compartment, from which the die plate is taken out, as a vacant address.

The step of taking out and storing die plates can be completely automated by inputting tire size codes of the tread to be processed next through a host computer totally controlling a tread extrusion line and by taking out the corresponding die plate.

Further, by connecting an automatic exchange apparatus for die plates to the apparatus of the present invention, full automation of exchange operation of die plates can be realized.

In the above explanation, there is only explained an embodiment in which the present invention is applied to a stocking device for die plates. However, the articles to be taken out and stored are not limited to die plates in the present invention, and the method and apparatus of the present invention can be applied to various kinds of articles.

According to the present invention, the following effects can be obtained.

(1) By establishing and directing the identification code of a required article, the carrier can automatically take out the correct required article and put it in a predetermined position, and also search for a vacant compartment in the stocking device for storing an article. Accordingly, the storing and taking out of articles can be carried out automatically, thereby reducing the operation time required for storing and taking out articles.

(2) The taking out or storing of a wrong article can successively be avoided by reading a code on the article itself (identification code) and checking it with a code inputted beforehand.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for taking out and storing articles comprising:
   stocking means having a plurality of compartments for storing articles;
   carrier means for taking out articles from the compartments of said stocking means and for storing articles in the compartments of said stocking means,
   said carrier means comprising a rectangular-shaped housing, with an open end adjacent said stocking means, including a fixed driving roller mounted in a lower portion within said rectangular-shaped housing near the open end and a pressing roller movably mounted above said fixed driving roller in an upper portion within said rectangular-shaped housing;
   driving means for driving said carrier means in both horizontal and vertical directions relative to said stocking means and for driving said rectangular-shaped housing of said carrier means towards and away from said stocking means to position said fixed driving roller in contact with a desired article within a specific one of the compartments,
   said pressing roller moving downward toward said fixing driving roller once the desired article contacts said fixed driving roller to secure the desired article therebetween and to draw the desired article out of the specific compartment into said rectangular-shaped housing upon rotation of said fixed driving roller and said pressing roller;
   control means for memorizing a position of a compartment in which an article is stored and for controlling said driving means in order to take out or store the desired article, wherein the desired article is identified via an identification code thereon.

2. The apparatus for taking out and storing articles of claim 1, further comprising code reader means for reading the identification code marked on an article and for ascertaining that a taken-out article is the desired article.

3. The apparatus for taking out and storing articles of claim 2, wherein said code reader means is mounted within said carrier means.

4. The apparatus for taking out and storing articles of claim 3, wherein said carrier means further comprises:
   guide rollers mounted within said rectangular-shaped housing for guiding the desired article as it is drawn further thereinto; and
   stop means mounted in an upper portion within said rectangular-shaped housing near an end opposite the open end, for positioning the desired article adjacent said code reader means.

5. The apparatus for taking out and storing articles of claim 4, where the articles are die plates for tire component manufacture and the compartments of said stocking means comprises shelf plates having a central groove extending into the compartment to facilitate insertion of a die plate.

6. A method of taking out and storing a specific article from stocking means having plural compartments in which many articles are stored, comprising the steps of:
   memorizing, in memory means, an identification code for each article and an address of compartments storing each article;
   inputting a specific identification code marked on a specific article into control means;
   moving carrier means to a position in front of a specific compartment which stores the specific article;
   removing the specific article from the specific compartment; and
   transferring the removed specific article with the carrier to a predetermined position and putting the removed specific article into a predetermined position,
   the carrier comprising a rectangular-shaped housing, with an open end adjacent the stocking means, including a fixed driving roller mounted in a lower portion within the rectangular-shaped housing near the open end and a pressing roller movably mounted above the fixed driving roller in an upper portion of the rectangular-shaped housing, said step of removing the specific article comprising the steps of driving the rectangular-shaped housing toward the stocking means, so that the specific article abuts against the fixed driving roller, moving the pressing roller downward toward the fixed driving roller once the specific article abuts the fixed driving roller to secure the specific article therebetween, and rotating the fixed driving roller and the pressing roller in a first direction to draw the specific article out of the specific compartment into the rectangular-shaped housing.

7. The method of taking out and storing a specific article from stocking means of claim 6 further including storing the specific article in a vacant compartment of the stocking means, comprising the steps of:

inputting an identification code marked on the specific article into the control means;

transporting the specific article from the predetermined position to a vacant compartment of the stocking means using the carrier;

inserting the specific article into the vacant compartment to store the specific article; and memorizing, in a memory, the number of the vacant compartment storing the specific article and the identification code of the specific article.

8. The method of taking out and storing a specific article from stocking means of claim 7, further comprising the step of reading the identification code marked on the specific article with reader means to check whether or not the removed specific article is a desired article.

9. The method of taking out and storing a specific article from stocking means of claim 8, wherein said step of reading the identification code is carried out upon loading the removed specific article from the predetermined position into the carrier means before moving.

10. The apparatus for taking out and storing articles of claim 5, wherein said shelf plates are made of a material having a low coefficient of friction to facilitate insertion of a die plate.

11. A carrier for removing and inserting articles into stocking means, the stocking means having a plurality of compartments for storing the articles, the carrier comprising:

a rectangular-shaped housing, with an open end adjacent the stocking means;

a fixed driving roller, mounted in a lower portion with said rectangular-shaped housing near the open end; and a pressing roller, movable mounted above said fixed driving roller within an upper portion of said rectangular-shaped housing;

said rectangular-shaped housing being positioned by driving means in front of a selected compartment and being driven toward the stocking means to position said fixed driving roller in contact with a selected article within the selected compartment, said pressing roller subsequently being driven downward toward said fixing driving roller once the selected article contacts said fixed driving roller to secure the selected article therebetween and to draw the selected article out of the selected compartment, into said rectangular-shaped housing, upon rotation of said fixed driving roller and said pressing roller in a first direction.

12. The carrier for removing and inserting articles into stocking means of claim 11, further comprising:

a plurality of guide roller pairs, mounted within said rectangular-shaped housing at predetermined intervals away from the open end toward an opposite second end of said rectangular-shaped housing, first guide rollers and second guide rollers of said plurality of guide roller pairs mounted respectively in lower and upper portions of said rectangular shaped housing;

the selected article being supported between said first and second guide rollers of said plurality of guide roller pairs as it is further drawn into said rectangular-shaped housing.

13. The carrier for removing and inserting articles into stocking means of claim 12, further comprising:

stopper means, mounted on an upper inner wall between the second end of said rectangular-shaped housing and one of said plurality of guide roller pairs, for stopping the selected article from being drawn further into said rectangular-shaped housing; and reader means mounted on a lower inner wall, on driving cylinder means, between the second end of said rectangular-shaped housing and said one of said plurality of guide roller pairs near said stopper means, said driving cylinder means driving said reader means upward, once the selected article is abutted against said stopper means, to read an identification code of the selected article.

14. The carrier for removing and inserting articles into stocking means of claim 13, wherein once said reader means has read said identification code, said stopper means is released to draw the desired article entirely within said rectangular housing.

15. The carrier for removing and inserting articles into stocking means of claim 11, said fixed driving roller and said pressing roller rotatable in a second direction, opposite the first direction, for inserting an article into a compartment.

* * * * *